United States Patent [19]

Ericksen

[11] Patent Number: 4,498,914
[45] Date of Patent: Feb. 12, 1985

[54] FILTER APPARATUS INCLUDING APPARATUS FOR CLAMPING AN AIR FILTER ELEMENT IN A FILTER HOUSING

[75] Inventor: Donald J. Ericksen, Minneapolis, Minn.

[73] Assignee: Donaldson Company, Inc., Minneapolis, Minn.

[21] Appl. No.: 471,866

[22] Filed: Mar. 3, 1983

[51] Int. Cl.³ .................... B01D 46/24; B01D 46/42
[52] U.S. Cl. ........................... 55/480; 55/493; 55/504; 55/505; 292/245; 292/257
[58] Field of Search ............... 55/480, 493, 504, 505; 210/237, 238, 447, 454; 292/256.5, 257, 203, 245

[56] References Cited

U.S. PATENT DOCUMENTS

| | | |
|---|---|---|
| 3,011,644 | 12/1961 | Farrel et al. . |
| 3,093,401 | 6/1963 | Hagendoorn . |
| 3,150,945 | 9/1964 | Baggeson . |
| 3,307,498 | 3/1967 | Stevens ........................ 292/256.5 |
| 3,383,841 | 5/1968 | Olsen et al. . |
| 3,458,050 | 7/1969 | Cooper . |
| 3,593,503 | 7/1971 | Andrews ........................... 55/493 |
| 3,672,130 | 6/1972 | Sullivan et al. . |
| 3,698,161 | 10/1982 | Brixius et al. . |
| 3,745,753 | 7/1973 | Risse . |
| 3,816,984 | 6/1974 | Neumann ........................ 210/237 |
| 3,823,533 | 7/1974 | Alverson et al. . |
| 4,002,443 | 1/1977 | Lorenz . |
| 4,171,963 | 10/1979 | Schuler . |

FOREIGN PATENT DOCUMENTS

| | | |
|---|---|---|
| 1278115 | 10/1961 | France . |
| 1569381 | 4/1969 | France . |
| 682217 | 11/1952 | United Kingdom . |

Primary Examiner—David L. Lacey
Attorney, Agent, or Firm—Merchant, Gould, Smith, Edell, Welter & Schmidt

[57] ABSTRACT

A filter apparatus having an apparatus for clamping a cylindrical air filter element in place against a fixed surface within a filter housing. The apparatus includes a clamping plate arranged to be moved between a first position in which the clamping plate presses the filter element against the fixed surface, and a second position in which the filter element is released from contacting either the plate or the fixed surface. To move the clamping plate into each position an arrangement of rotatable cam rods, support fins and bearing saddles are provided. Both the clamping plate and the fixed surface are substantially planar and oriented in the support structure so that when the filter is not clamped therebetween it can be removed from the support structure in a direction perpendicular to its main axis.

10 Claims, 6 Drawing Figures

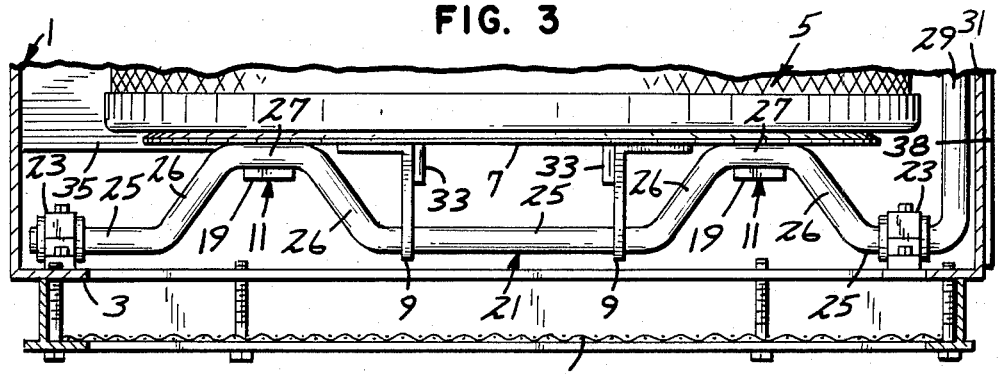
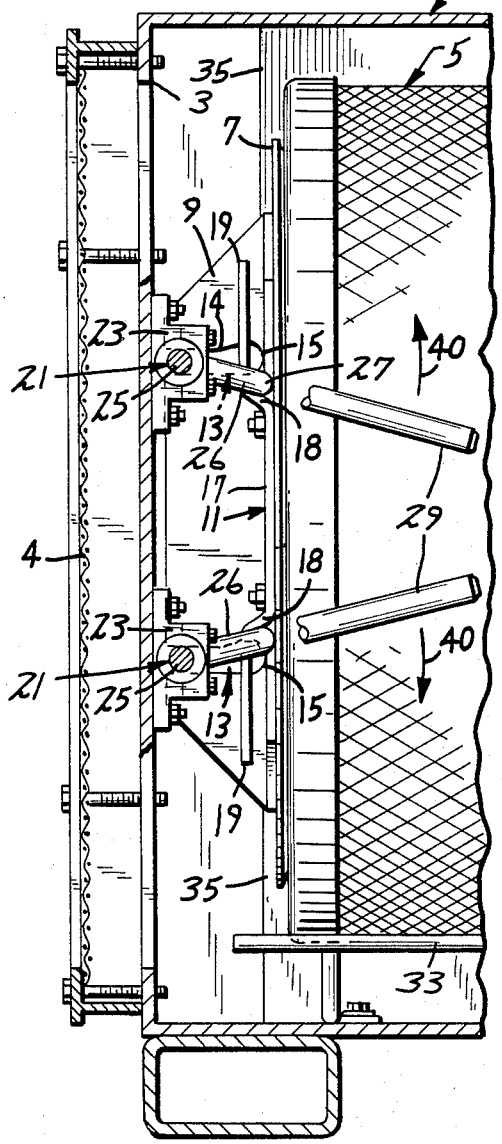
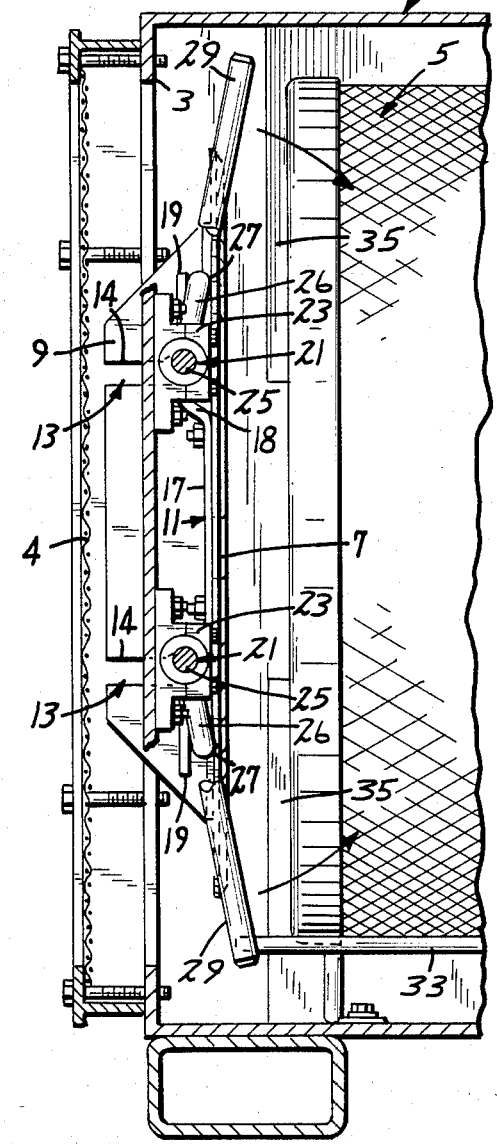

FILTER APPARATUS INCLUDING APPARATUS FOR CLAMPING AN AIR FILTER ELEMENT IN A FILTER HOUSING

BACKGROUND OF THE INVENTION

The present invention relates to devices for holding an air filter, and particularly a cylindrical air filter, in place.

A cylindrical air filter generally takes the form of a hollow cylinder open at both ends. In typical use, one end of the cylinder is sealed and filtering is accomplished by forcing air through the sides thereof by either forcing it in at the open end and hence out the sides, or drawing it out at the open end and hence in the sides.

To utilize the typical cylindrical air filter, a support structure or housing is usually provided to which, or in which, the filter is secured with one end thereof sealed. In the prior art, this has generally been accomplished by the use of a cone and yoke device. With this device, a cone with perforated sides is inserted into the first end of the air filter far enough that the sides of the cone press against the sides of the air filter at the first end. A threaded bolt is provided to extend from the tip of the cone past the second end of the filter. A metal sealing and clamping plate with a center hole is then placed over the second end of the filter, with the threaded bolt extending through the center hole. The entire arrangement is then secured in place with a wing nut tightened onto the end of the threaded bolt, whereby the plate is held pressed against the filter and the filter against the cone. Air may move into or out of the center of the filter only through its sides and the perforations in the cone. U.S. Pat. Nos. 4,171,963 (Schuler); 4,135,899 (Gauer); and 3,745,753 (Risse). While this cone and yoke arrangement is suitable for many uses, changing the filter requires access along the center axis. Accordingly, the cone and yolk arrangement is undesirable or unsuitable where axial access is limited or impossible.

U.S. Pat. No. 3,672,130 (Sullivan, et al.) uses spring clips and an annular recess in the sealing plate to support a cylindrical filter. French Pat. No. 1,569,381 uses a similar annular recess, but uses a layer of compressible plastic instead of spring clips. Like the cone and yoke system, these systems require axial access for filter replacement. Thus, they, too, are undesirable or unsuitable where axial access is limited or impossible.

It is the purpose of the present invention to provide a sealing and clamping apparatus which permits replacement of an air filter through an access on the side of the air filter support structure or housing, rather than along its axis. A significant reduction in the amount of clearance which must be allowed around the filter is thereby accomplished, making the present invention highly suitable for use in a duct line or other situations where side access and minimum space usage are desired.

SUMMARY OF THE INVENTION

According to the present invention, a clamping plate is provided to seal one end of a filter and press the other end thereof against a fixed surface apertured to allow passage of air through the inside of the filter. The plate and the fixed surface are substantially planar to allow the filter to be inserted and withdrawn from the side of the housing.

The clamping plate is held in place and moved by the interaction of support fins, bearing saddles and cams. The support fins and bearing saddles are mounted to one side of the clamping plate, with the fins at substantially right angles to the surface of the plate. Slots are provided in the fins through which the cams extend. The bearing saddles extend substantially parallel to the fins and have portions sufficiently spaced away from the surface of the plate to allow the cams to pass thereunder. The cams are mounted on either side of the support structure for rotation about their main axes. Each cam has portions co-axial with its main axis and portions offset therefrom. The central co-axial portion of each cam passes through the slots in the support fins. The offset portions pass between the bearing saddles and the clamping plate. Each cam is provided with a handle at one end thereof. Preferably, the handle is fashioned from an extension of the cam, with the extension at a substantially right angle with the main axis of the cam.

In operation, rotation of a cam via its handle causes the offset portions thereof to press against the clamping plate and in turn the filter, the bearing saddle providing an over center abutment against which the offset portions of the cam rest when the cam is in the clamped position. The cam remains in the clamped position until rotated in the opposite direction due to the locking force provided by the clamping pressure.

When a cam is rotated in the opposite direction, the offset portions pull against the bearing saddles, causing the plate to be pulled back and away from the filter element. While the plate is being pulled back, the co-axial portion of the cam slides in the slots of the support fins. The ends of the slots closest to the clamping plate are slightly wider or enlarged, so that when the plate is pulled back it drops down into a stable position resting on the co-axial portion of the cam. With the plate thus withdrawn, the filter element may be readily removed and replaced through an access on the side of the support structure or housing.

BRIEF DESCRIPTION OF THE DRAWINGS

FIG. 3 is a cross-sectional plan view of the clamping apparatus of the present invention taken along lines 3—3 of FIG. 2;

FIG. 4 is a cross-sectional view taken along lines 4—4 of FIG. 2 with the apparatus of the present invention in the clamping position;

FIG. 5 is a cross-sectional view taken along lines 4—4 of FIG. 2 with the apparatus of the present invention in an unclamped position.

DETAILED DESCRIPTION OF THE INVENTION

The preferred embodiment of the present invention will be explained with reference to FIGS. 1-6, in which like elements are designated with like reference numbers.

Figure 1:
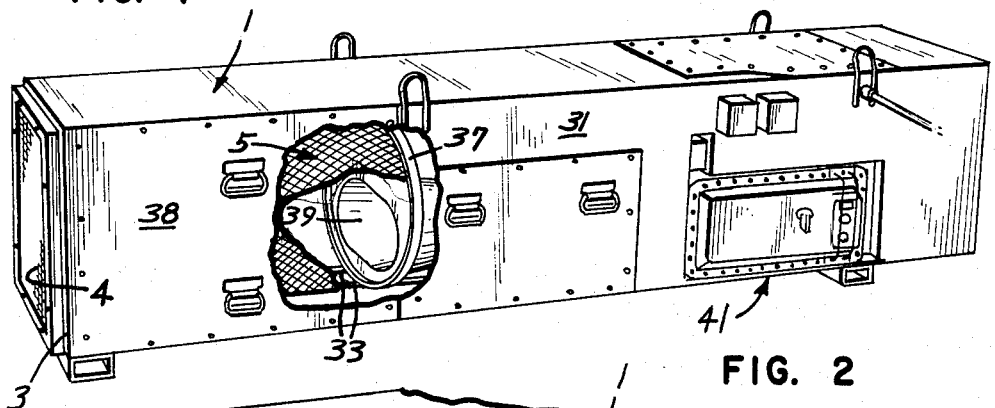
FIG. 1 is a perspective view of an exemplary air filter housing and filter with a portion thereof cut away.
Figure 2:
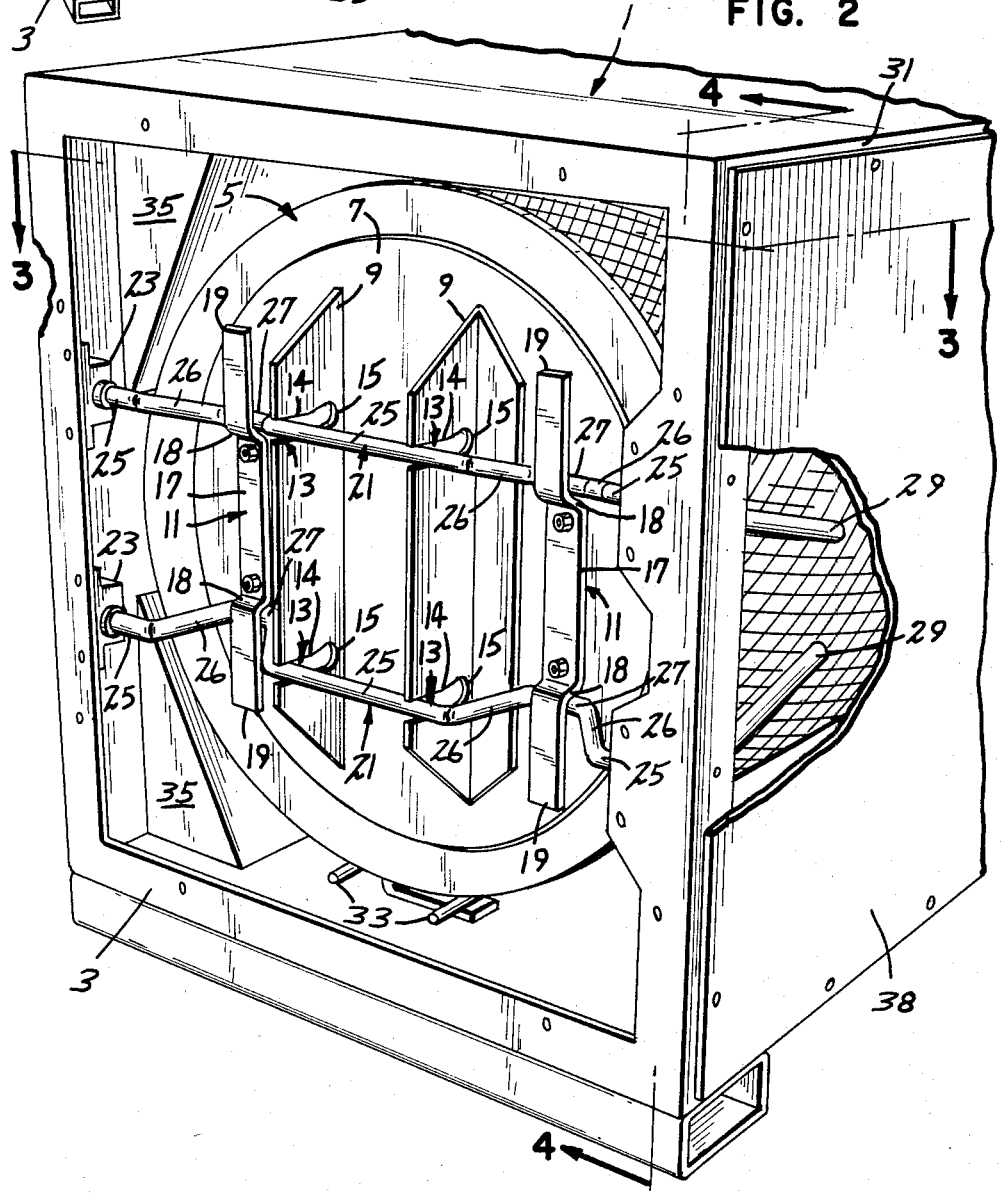
FIG. 2 is a perspective view of the clamping apparatus of the present invention.
Figure 6:
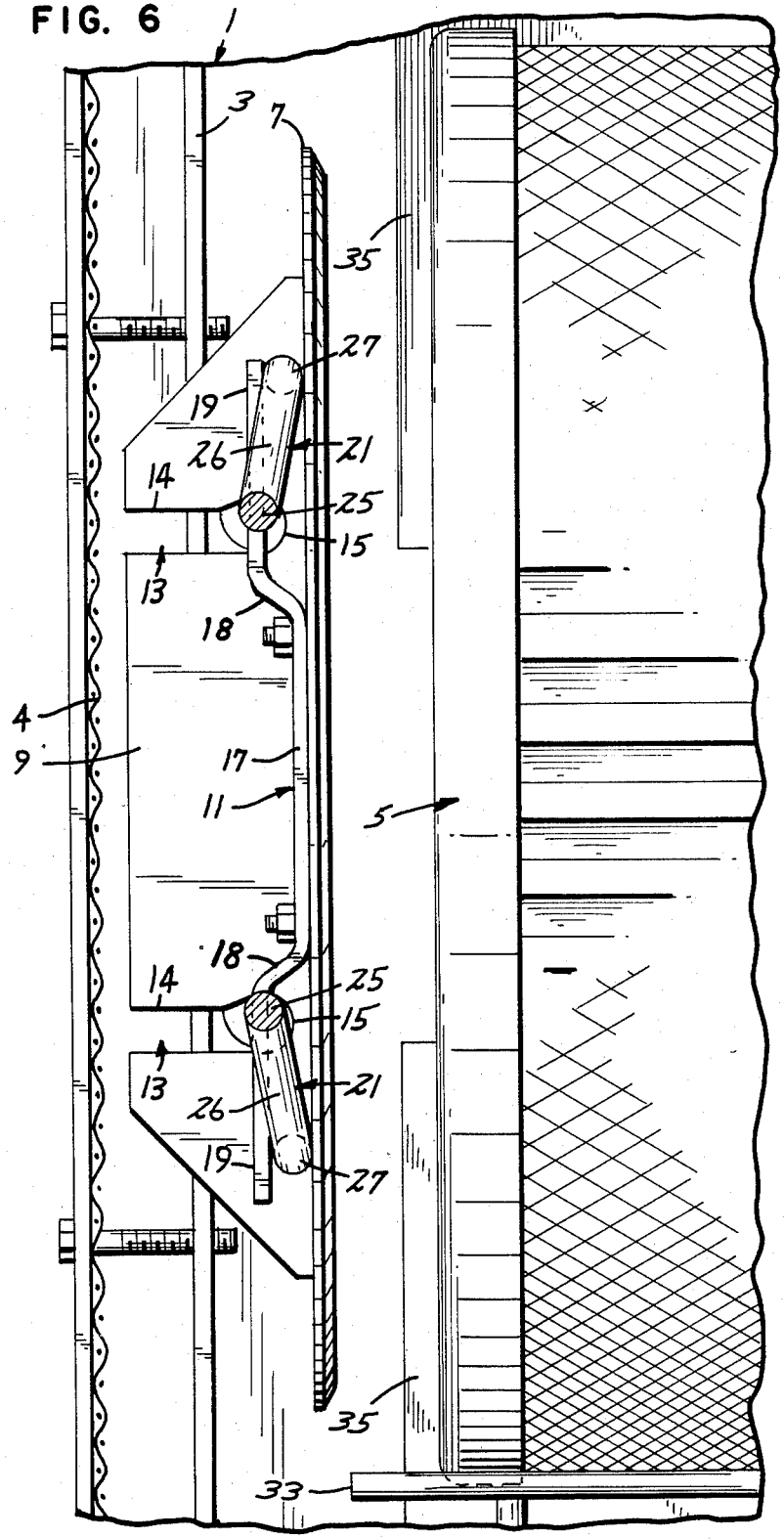
FIG. 6 is an enlarged fragmentary view of the clamping apparatus of the present invention as shown in FIG. 5.

A filter duct or housing 1 in which the present invention may be utilized may be seen in FIG. 1. The housing 1 has a support structure 3, to one end of which a grating 4 is attached and at the other end of which is a fixed surface 37. An elongated hollow cylindrical air filter 5 is disposed in the space between the grating 4 and the fixed surface 37. The filter 5 is preferably of the pleated type shown through the cutaway in FIG. 6. As best seen in FIG. 2, where the grating 4 has been removed, a clamping plate 7 is located in the housing 1 between the filter 5 and the grating 4. The clamping plate 7 presses against and seals one end of the filter 5. As seen in FIG. 1, the other end of the filter 5 is in turn pressed against the fixed surface 37, clamping the filter 5 in place and sealing this second end. An opening 39 in the fixed surface 37, visible through the cutaway in FIG. 1, allows passage of air from the inside of the filter 5 through the adjoining chamber of the duct 41. The adjoining chamber 41 may contain the fans or blowers required to force air through the filter 5. In use, air flows in through the grating 4, through the sides of the filter 5 and is drawn out through the opening 39. Alternatively, it is blown in through the opening 39, through the filter 5 and through the grating 4. The air flow direction may be momentarily reversed to clean the filter 5.

The clamping plate 7 has two support fins 9 and two bearing saddles 11. Each support fin has two slots 13 formed therein, with the end 15 of each slot slightly enlarged. Each bearing saddle 11 has a portion 17 attached to the clamping plate 7 and two portions 19 spaced from but substantially parallel to the clamping plate 7.

The assembly of clamping plate 7, support fins 9, and bearing saddles 11 is supported by two rods or cams 21. Each cam has three co-axial portions 25 and two offset portions 27. The cams 21 are rotatably mounted to the support structure 3 with pillow blocks 23 at their two end co-axial portions 25. The remaining co-axial portions 25 pass through the respective slots 13 and are engageable with the sides thereof. The offset portions 27 pass between the clamping plate 7 and the spaced portions 19 of the bearing saddles 11 and are engageable with either the clamping plate 7 or the spaced portions 19 of the bearing saddles 11. Each of the cams 21 has a handle 29 at the side 31 of the filter housing 1 through which access is to be had to the filter 5, for example, through a removable panel 38 as shown in FIG. 1. Filter support rods 33 are provided in housing 1 to help properly position the filter 5 during installation thereof. Side blocks 35 are provided to regulate air flow.

The operation of the clamping mechanism may be best explained by reference to FIGS. 4 and 5. In FIG. 4, the offset portions 27 of the cams 21 can be seen pressing the plate 7 against the filter 5 and in turn the filter 5 against the fixed surface 37, whereby the filter 5 is clamped in place. In the over-center position shown, the offset portions 27 of the cams 21 press against the bend 18 of the bearing saddle 11. The plate 7 and cams 21 are held in the clamped position by the opposing compression force from the filter 5, which forces the offset portions 27 against the corresponding bends 18. To move the apparatus of the present invention to the unclamped position shown in FIGS. 5 and 6, handles 29 are moved in the direction indicated by the arrows 40. Movement of the clamping apparatus from the clamped position to the unclamped position is accomplished by rotating the rods 21 so that the offset portions 27 thereof press against the spaced portions 19 of the bearing saddles 11. As the clamping apparatus withdraws from the filter 5, vertical movement is prevented by the slots 13 formed in the support fins 9. The top sides 14 of the slots 13 rest on and slide along the central co-axial portions 25 of the cams 21. When the cams 21 reach the enlarged ends 15 of the slots 13, the clamping apparatus will shift down slightly as the central co-axial portions 25 move into the top of the enlarged portions 15 of the slots 13. This provides a stable, completely withdrawn position for the clamping apparatus. The filter 5 may then be removed and replaced without any interference from the clamping apparatus or the need to manually hold the clamping apparatus in place away from the filter 5.

Movement of the clamping apparatus in a direction parallel to the axis of rotation of the cams 21 is prevented by the interaction of the cams 21, support fins 9 and bearing saddles 11, as may best be seen in FIG. 3. If the clamping plate 7 moves in either direction parallel to the axis of rotation of the cams 21, the spaced portions 19 of the bearing saddles 11 and the support fins 9 abut the angled portions 26 of the cams 21, whereby movement in said directions is prevented.

Comparing FIGS. 4 and 5, it may be seen that the handles 29 act as a fail-safe mechanism as well as a means for rotating the cams 21. The handles 29 will prevent removal of the filter 5 until they have been rotated into a completely withdrawn position, as shown in FIG. 5. Thus, any attempts to remove or replace the filter 5 when the clamping apparatus is not completely withdrawn will be prevented.

Thus, it will be seen that the present invention provides an air filter clamping apparatus which permits a filter to be installed and removed from a direction perpendicular to its axis. It shall be understood that the above described embodiment of the present invention is merely exemplary, and that the spirit and scope of the present invention is not limited thereto.

What is claimed is:

1. A filter apparatus comprising:
   a filter housing having a filter element therein;
   means, constructed and arranged to be rotatably mounted at one end of a filter element support structure in said housing, for applying pressure to said filter element contained within said support structure, said pressure applying means including portions coaxial with an axis about which said pressure applying means rotates and having portions offset from said axis, said support structure having a space formed therein for accepting said filter element and having a fixed surface, opposite the first mentioned end, against which said filter element is pressed by said pressure applying means;
   clamping means movable between a first position in which said filter element is clamped in place against said fixed surface and a second position allowing removal of said filter element from said support structure, said clamping means being constructed and arranged to move to said first position when pressed against by said offset portions of said pressure applying means; and
   support means attached to said clamping means for preventing lateral movement of said clamping means when said clamping means is in said second position, with said support means resting against said coaxial portions of said pressure applying means.

2. A filter apparatus comprising:
   a filter housing;
   an elongated filter element, having a first end and a second end, within said housing;
   a clamping plate movable between a first position engaging said first end of said filter element so as to hold said filter element in said housing, and a second position permitting removal of said filter element from said housing;

first and second bearing saddles attached to said clamping plate, each of said saddles having at least one portion spaced from said clamping plate a predetermined distance;

first and second axially rotatable cams spaced apart from each other, each of said cams having portions offset from an axis of rotation and portions coaxial with said axis of rotation, each of said cam offset portions extending through one of said spaced portions of one of said bearing saddles, said offset portions of said cams each being engageable with said clamping plate so as to move said plate to said first position when said cams are rotated in a first direction and being engageable with said bearing saddles to move said clamping plate to said second position when said cams are rotated in a second direction opposite said first direction; and, first and second support means, each mounted on said clamping plate and engageable with at least one of said coaxial portions of each of said cams for cooperating with said cams and said bearing saddles to permit movement of said plate between said first and second positions and for preventing lateral movement thereof.

3. Apparatus according to claim 2, wherein each of said cams is a rod having a first end, a second end, portions co-axial with said axis of rotation and portions offset from said axis, each of said rods further including a handle extending substantially perpendicular to said axis at one of said cam end, such that said cams may be rotated by rotating said handles about said axis.

4. Apparatus according to claim 2, wherein said housing has a fixed surface therein, with said second end of said filter element being positioned adjacent said fixed surface, with said clamping plate arranged adjacent the element first end, and the element being pressed against the fixed surface by said clamping plate.

5. Apparatus according to claim 2, wherein each of said support means comprises a fin projecting from said clamping plate, each of said fins having portions with slots formed therein through which extend one of said co-axial portions of one of said cams, said slots being located in a plane containing said axis of rotation of said cams and in substantially perpendicular relationship to said spaced portions of said bearing saddles.

6. Apparatus according to claim 2, wherein each of said bearing saddles comprises a central portion attached to said clamping plate, said central portion having an uppermost part and a lowermost part, and a first portion extending from said central portion uppermost part and a second portion extending from said central portion lowermost part, with said first and second extending portions being spaced a pre-determined distance from said clamping plate.

7. A filter apparatus comprising:
a filter housing;
a filter element within said housing;
a support structure in said filter housing having first and second ends opposite one another with a space therebetween accepting said filter element therein;
a fixed surface at said support structure first end against which said filter element may be pressed;
a movable clamping plate at said support structure second end, said plate having first and second oppositely facing sides, with said second side facing said support structure fixed surface;

a plurality of rods rotatably mounted at said support structure second end, said rods each having a plurality of portions coaxial with an axis of rotation of said rod and a plurality of portions offset from said axis such that each of said offset portions describe an arc when said rod is rotated about said axis;

a plurality of support fins attached to and extending outwardly from said first side of said clamping plate, each of said fins having a plurality of slots formed therein through which at least one of said co-axial portions of one of said rods passes such that said support fins support said clamping plate and prevent lateral movement thereof when said slots contact said coaxial portions of said rods; and a plurality of bearing saddles attached to said first side of said clamping plate, said bearing saddles each having at least one portion substantially parallel to but spaced from said first side, said offset portions of said rods extending between said saddle spaced portions and said plate first side, such that when said offset portions describe an arc while being moved generally in the direction towards the second side of said clamping plate, said offset portions of said rods will press against said plate first side, causing said clamping plate to press against said filter element and in turn against said fixed surface and thereby clamp said filter element in place between said clamping plate and said fixed surface, and such that when said offset portions describe an arc while being moved generally in a direction away from said second side of said clamping plate each of said offset portions presses against said spaced portions of said bearing saddles causing said bearing saddles to move said clamping plate away from said filter element and thereby release said filter element from between said clamping plate and said fixed surface.

8. A filter apparatus according to claim 7, wherein each of said rods further includes a handle extending substantially perpendicular to said axis of rotation from an end of each of said rods, with each of said rods being rotatable about said axis by turning said handles.

9. A filter apparatus according to claim 7, wherein each of said slots in said support fins further includes a portion having a greater width at the end of said slot closest to said plate, such that when said plate is in a substantially vertical orientation and is not pressing against said filter element, said rods extend through said portions of said slots with said greater width, with said rods and said plate remaining so oriented until moved by an external force.

10. A filter apparatus according to claim 7, wherein:
said plurality of rods comprises a pair of rods, each of said rods having two of said offset portions and three of said co-axial portions in alternating arrangement thereof;
said plurality of support fins comprises a pair of support fins, each of said support fins having two of said slots formed therein with each of said slots constructed to receive one of said rods; and
said plurality of bearing saddles comprises a pair of bearing saddles, each said bearing saddle having two of said spaced portions.

* * * * *